United States Patent
Ruhnau et al.

(10) Patent No.: US 11,580,752 B2
(45) Date of Patent: Feb. 14, 2023

(54) METHOD FOR SUPPORTING A CAMERA-BASED ENVIRONMENT RECOGNITION BY A MEANS OF TRANSPORT USING ROAD WETNESS INFORMATION FROM A FIRST ULTRASONIC SENSOR

(71) Applicant: Robert Bosch GmbH, Stuttgart (DE)

(72) Inventors: Paul Ruhnau, Leonberg-Hoefingen (DE); Simon Weissenmayer, Flein (DE)

(73) Assignee: Robert Bosch GmbH, Stuttgart (DE)

( * ) Notice: Subject to any disclaimer, the term of this patent is extended or adjusted under 35 U.S.C. 154(b) by 70 days.

(21) Appl. No.: 17/252,946

(22) PCT Filed: Sep. 16, 2019

(86) PCT No.: PCT/EP2019/074653
§ 371 (c)(1),
(2) Date: Dec. 16, 2020

(87) PCT Pub. No.: WO2020/088829
PCT Pub. Date: May 7, 2020

(65) Prior Publication Data
US 2021/0124957 A1  Apr. 29, 2021

(30) Foreign Application Priority Data
Oct. 31, 2018 (DE) .......................... 102018218733.9

(51) Int. Cl.
*G06V 20/56* (2022.01)
*B60S 1/08* (2006.01)
(Continued)

(52) U.S. Cl.
CPC ............ *G06V 20/56* (2022.01); *B60S 1/0855* (2013.01); *G01S 15/931* (2013.01); *G06V 20/182* (2022.01); *G06V 40/1306* (2022.01)

(58) Field of Classification Search
CPC ..... G01S 7/539; G01S 15/931; G06V 20/182; G06V 20/56; G06V 40/1306;
(Continued)

(56) References Cited

U.S. PATENT DOCUMENTS 9,550,418 B1 * 1/2017 Logan ................... B60K 28/10
2005/0276447 A1  12/2005 Taniguchi et al.
(Continued)

FOREIGN PATENT DOCUMENTS

DE   102004020282 A1 *  7/2006 ............... G01D 5/00
DE   102005023696 A1   11/2006
(Continued)

OTHER PUBLICATIONS

International Search Report for PCT/EP2019/074653, dated Mar. 4, 2020.
(Continued)

*Primary Examiner* — Daniel L Murphy
*Assistant Examiner* — Amie M Ndure
(74) *Attorney, Agent, or Firm* — Norton Rose Fulbright US LLP; Gerard Messina

(57) ABSTRACT

A method and an apparatus for supporting a camera-based environment recognition by a means of transport using road wetness information from a first ultrasonic sensor. The method includes: recording a first signal representing an environment of the means of transport by the first ultrasonic sensor of the means of transport; recording a second signal representing the environment of the means of transport by a camera of the means of transport; obtaining road wetness information on the basis of the first signal; selecting a (Continued)

predefined set of parameters from a plurality of predefined sets of parameters as a function of the road wetness information; and performing an environment recognition on the basis of the second signal in conjunction with the predefined set of parameters.

10 Claims, 3 Drawing Sheets

(51) Int. Cl.
*G01S 15/931* (2020.01)
*G06V 20/10* (2022.01)
*G06V 40/13* (2022.01)

(58) Field of Classification Search
CPC ............... B60S 1/0855; G06K 9/0002; G06K 9/00651; G06K 9/00791
See application file for complete search history.

(56) References Cited

U.S. PATENT DOCUMENTS

| | | | | |
|---|---|---|---|---|
| 2007/0057781 | A1* | 3/2007 | Breed | B60K 35/00 340/457.1 |
| 2014/0172727 | A1* | 6/2014 | Abhyanker | G06Q 30/0645 705/307 |
| 2015/0158513 | A1* | 6/2015 | Costa | B61L 23/04 348/144 |
| 2015/0202770 | A1* | 7/2015 | Patron | G06Q 30/0265 901/50 |
| 2015/0211870 | A1* | 7/2015 | Nickolaou | G08G 1/164 701/28 |
| 2016/0001780 | A1 | 1/2016 | Lee et al. | |
| 2016/0031441 | A1* | 2/2016 | Foley | G05B 9/02 701/23 |
| 2016/0357187 | A1 | 12/2016 | Ansari | |

FOREIGN PATENT DOCUMENTS

| | | | | |
|---|---|---|---|---|
| DE | 102006037591 | A1 * | 2/2008 | ............ G01S 15/87 |
| DE | 102006037591 | A1 | 2/2008 | |
| DE | 102011056051 | A1 | 6/2013 | |
| DE | 102012221518 | A1 | 5/2014 | |
| DE | 102013226631 | A1 * | 6/2015 | ............ B60W 40/06 |
| DE | 102013226631 | A1 | 6/2015 | |
| DE | 102015015022 | A1 | 5/2016 | |
| DE | 102015106401 | A1 | 10/2016 | |
| DE | 102015106408 | A1 * | 10/2016 | ............ B60T 8/172 |
| DE | 102015106408 | A1 | 10/2016 | |
| DE | 102016009022 | A1 | 2/2017 | |
| DE | 102016103251 | A1 * | 8/2017 | ............ B60W 40/04 |
| DE | 102016103251 | A1 | 8/2017 | |
| DE | 102016122987 | A1 | 5/2018 | |
| DE | 102016122987 | A1 * | 5/2018 | |
| JP | H06249955 | A | 9/1994 | |
| JP | 2007322231 | A | 12/2007 | |
| JP | 2017078912 | A | 4/2017 | |
| JP | 2018066726 | A | 4/2018 | |
| JP | 2018072236 | A | 5/2018 | |
| WO | 2012123554 | A1 | 9/2012 | |

OTHER PUBLICATIONS

Nathalia Nascimento et al., "A Context-Aware Machine Learning-Based Approach," Computer Science and Software Engineering, CASCON, 2018, pp. 40-47.

* cited by examiner

METHOD FOR SUPPORTING A CAMERA-BASED ENVIRONMENT RECOGNITION BY A MEANS OF TRANSPORT USING ROAD WETNESS INFORMATION FROM A FIRST ULTRASONIC SENSOR

FIELD

The present invention relates to a method for supporting a camera-based environment recognition by a means of transport using road wetness information from a first ultrasonic sensor.

BACKGROUND INFORMATION

In the related art, conventional means of transport perform a camera-based environment recognition to obtain information about objects in the environment of the means of transport. This information is received, for example, by driver assistance systems and/or systems for autonomously controlling the means of transport and used by the same. Such an environment recognition is based on conventional image analysis algorithms and object classification algorithms that generally use one or more classifiers for certain objects.

Also conventional are rain sensors for means of transport for sensing the presence of a precipitation. They are usually mounted in an upper area of a windshield of the means of transport and are adapted for sensing the presence of precipitation on the windshield. Wetness information ascertained by such a rain sensor can be used to select suitable classifiers of an environment recognition.

Also conventional are ultrasonic sensors which are often used in connection with means of transport for parking assistance systems or similar driver assistance systems. To be able to ascertain distances of objects in the environment of the means of transport to the means of transport on the basis of propagation times of the ultrasonic signals, such ultrasonic sensors are mostly mounted for this purpose on means of transport in such a way that the emission and sensing direction thereof are essentially horizontal to the means of transport.

SUMMARY

In accordance with a first aspect of the present invention, a method is provided for supporting a camera-based environment recognition by a means of transport using road wetness information from a first ultrasonic sensor. The means of transport (i.e., transport device) may be a road vehicle (for example, a motorcycle, passenger vehicle, transport vehicle, truck) or a rail vehicle or an aircraft/airplane or a watercraft, for example. Moreover, the method steps described in the following may be performed completely or partially by an apparatus of the means of transport, in accordance with the present invention. The apparatus may include an evaluation unit which preferably has a data input. The evaluation unit may be in the form of an ASIC, FPGA, processor, digital signal processor, microcontroller, or the like and be connected by information technology to an internal and/or external memory unit. Moreover, the evaluation unit may be adapted to implement the method according to the present invention in conjunction with a computer program executed by the evaluation unit.

In a first step of the method according to an example embodiment of the present invention, a first signal representing an environment of the means of transport is recorded by the first ultrasonic sensor of the means of transport. The ultrasonic sensor may also be an ultrasonic sensor of the means of transport that is/may be used for other purposes. Alternatively or additionally, a dedicated ultrasonic sensor may also be used for the method according to the example embodiment of the present invention. The ultrasonic sensor of the means of transport may be an ultrasonic sensor of a parking assistance system or of another driver assistance system of the means of transport, for example. The ultrasonic sensor may be mounted in a front bumper or in the area of a rear-end section of the means of transport or also at other positions of the means of transport, for example, making it possible for both the tire noises, as well as the roadway ahead or behind and the environment thereof to be recorded. Moreover, the ultrasonic sensor may be directly or indirectly connected by information technology (i.e., for example, via another control unit of the means of transport) to the data input of the evaluation unit according to the present invention. The connection may be established, for example, via a bus system (for example, CAN, LIN, MOST, Ethernet, etc.) of an electrical system of the means of transport. The first signal of the first ultrasonic sensor received by the evaluation unit may be initially stored in the memory unit connected to the evaluation unit for a subsequent processing by the evaluation unit.

In a second step of the method according to the present invention, a second signal representing the environment of the means of transport is recorded by a camera of the means of transport. The second signal may preferably be acquired at an instant that is essentially identical to that of the first signal, making it possible to ensure that the two signals each contain temporally corresponding environment information. A time offset between the two signals may arise due to different sensor types and different signal processing chains and signal transmission chains. A time offset between the two signals may be within a range that is preferred, but not necessarily to be ensured for the example method, for example, of between a few milliseconds and a few hundred milliseconds, or also in the second range. The camera may be a 2D or 3D camera having a standard image resolution, an HD or an ultra-HD image resolution, or an infrared camera, for example. The camera may preferably be mounted and oriented on the means of transport in a way that enables it to capture an environment ahead of the same. However, such a placement and/or orientation of the camera is not limited to this example. Analogously to the first ultrasonic sensor, the camera may be directly or indirectly connected by information technology to the evaluation unit according to the present invention via the electrical system of the means of transport. A preferred specific embodiment of the present invention provides that the camera be connected by information technology to an image processing unit of the means of transport that is adapted for receiving image signals from the camera and for processing the same. Such an image processing unit may be, inter alia, a component of a driver assistance system or of a system for an autonomous operation of the means of transport. Moreover, this preferred specific embodiment provides that the image processing unit be connectable by information technology to the evaluation unit in accordance with the present invention, allowing it to transmit the below specified road wetness information to the image processing unit. Alternatively or additionally to this specific embodiment, the image processing unit may be a component of the evaluation unit itself (or also vice versa), allowing a communication between these two components to take place directly and not via the electrical system of the means of transport. This may be realized, for example, in such a way that a logic to be executed by the evaluation unit in accordance with the present invention for implementing the method steps in accordance with the present invention is implemented in the form of a computer program by the image processing unit.

In a third step of the example method according to the present invention, the road wetness information is ascertained on the basis of the first signal. For this purpose, the evaluation unit may compare a noise level of the first signal to a predefined threshold value for a noise level that may be stored in the memory unit connected to the evaluation unit. The predefined threshold value for a noise level is preferably selected in such a way that when the noise level exceeds the predefined threshold value, a current road wetness may be assumed. Conversely, when the noise level falls below the predefined threshold value, a dry road surface may be assumed. A result of determining the road wetness information may, in turn, be stored in the memory unit. Alternatively or additionally to a pure distinction between a wet or a dry road surface, in the case that the noise level of the first signal exceeds the predefined threshold value, the evaluation unit may estimate a degree of wetness by taking into consideration a level of exceedance of the predefined threshold value by the noise level of the first signal. Moreover, it is also possible to use a plurality of predefined threshold values for a noise level, the respective predefined threshold values being able to correspond to different velocities and/or velocity ranges of the means of transport. In other words, it may be advantageous for the evaluation unit to receive information about a current velocity of the means of transport provided via the electrical system of the means of transport, making it possible for the evaluation unit to select a respectively corresponding, predefined threshold value from a plurality of predefined threshold values as a function of a value of a current velocity since a higher velocity is typically associated with a higher noise level in the first signal. This makes it possible to prevent the evaluation unit from erroneously detecting a road wetness at a higher velocity of the means of transport, although the road surface is actually in a dry state.

In a fourth step of the example method according to the present invention, a predefined set of parameters is selected from a plurality of predefined sets of parameters as a function of the road wetness information. The plurality of predefined sets of parameters may, for example, represent different configurations of a classifier which is adapted for analyzing an environment of the means of transport on the basis of the second signal and for detecting objects in this environment. Preferably, such a classifier may be part of a computer program that is executed by the image processing unit and/or the evaluation unit. In the event that the evaluation unit according to the present invention and the image processing unit are implemented as separate components, the predefined set of parameters may be selected by the image processing unit as a function of the road wetness information and possibly other information (for example, as a function of a velocity of the means of transport), which the evaluation unit may provide via the electrical system of the means of transport. An aim of using different predefined sets of parameters for the environment recognition is using those which are adapted to a current environment (i.e., wet or dry). The reason for this is that, in the course of environment recognition, a classifier trained for a dry environment is generally only able to ensure inadequate or unreliable results in a wet environment, for example, due to water (tire spray) splashed up by means of transport in front. Conversely, a classifier trained for a wet environment, in turn, is often not able to provide optimum recognition results in a dry environment. If the wetness information provided by the evaluation unit include information about a degree of wetness in addition to a pure wetness/dryness distinction, a predefined set of parameters adapted to the particular degree of wetness may additionally be selected as a function thereof.

In a fifth step of the example method according to the present invention, an environment recognition is performed on the basis of the second signal in conjunction with the predefined set of parameters. Since it is possible to use predefined sets of parameters, which are adapted in each case to the environment recognition on the basis of the available wetness information, a performance of the environment recognition may be optimized accordingly. An enhanced reliability of the environment recognition resulting therefrom may, in turn, lead to greater certainty upon use of the means of transport.

Preferred embodiments of the present invention are described herein.

In accordance with an advantageous embodiment of the present invention, the road wetness information may additionally be ascertained as a function of a velocity and/or an acceleration and/or a motor speed of the means of transport. The above, which is already described in detail, advantageously takes into account a current velocity in determining current road wetness information. Analogously thereto, values of a current acceleration and/or of a current motor speed of the means of transport, which are received via the electrical system of the means of transport, may advantageously be similarly taken into account.

In another advantageous embodiment of the present invention, the predefined set of parameters may represent a configuration of a trained, self-learning system. This means that the classifier described above may be realized on the basis of a self-learning system, for example, such as a neural network (for example, having a deep learning structure). Moreover, other types of self-learning systems may also be used. In this manner, training runs of the means of transport may be conducted in different wetness situations and the respective trained configurations of the self-learning system stored in the form of different predefined sets of parameters.

In another advantageous embodiment of the present invention, the predefined sets of parameters may be alternatively or additionally selected as a function of a change in the noise level and/or a current temperature and/or an amount of water present in the environment of the means of transport. As described above, a change in the noise level may be caused by different amounts of water on a road surface. Moreover, a change in the noise level may also be caused, however, by a change in a distance to vehicles in front. Due to the associated, changed visibility conditions, it may be expedient in both cases to use corresponding, adapted sets of parameters for the environment recognition. By additionally analyzing the second signal, it is possible to distinguish whether a change in the noise level is caused by a changed amount of water or by changes in the distance of vehicles in front, for example, by ascertaining an altered size of vehicles directly in front. Alternatively or additionally, signals from other environment sensors of the means of transport may also be used to evaluate a current situation. It may be especially advantageous here to consider information about distance to vehicles in front from a LIDAR and/or a radar system of the means of transport. The predefined sets of parameters generated and used for the cases mentioned above may have the effect of making it possible to better and/or more rapidly recognize means of transport, which are partially concealed by a spray cloud, even if the camera is only able to capture vague outlines of means of transport in front.

Moreover, when selecting the predefined set of parameters, it may be useful to take into account a current outside temperature since an outside temperature of less than 4° C. and, in particular, of less than 0° C. makes it possible to infer the potential presence of snow on the shoulder and/or on the roadway itself. It may be highly probable that snow is present, at least on the shoulder, when there is an outside temperature of 0° C. or less and, at the same time, a detected road wetness. On the basis of this information, another suitable predefined set of parameters may be selected and used in the course of the environment recognition, making it possible for a road edge to be reliably recognized, for example, even when snow is present.

In another advantageous embodiment of the present invention, the road wetness information may be ascertained as a function of a freedom from interference of the first signal. Freedom from interference is to be understood here as the absence of a wide variety of interference effects, which make it more difficult or even impossible to reliably detect road wetness, such as building construction on the roadside and/or other means of transport in the immediate vicinity of the means of transport. Such interference effects may be determined, for example, on the basis of the second signal or on the basis of signals from other environment sensors, such as LIDAR and/or radar sensors. If an interference effect of the type under discussion is present, the evaluation unit may transmit road wetness information, which represents a road wetness condition prior to the occurrence of the interference effect, to the image processing unit. The overall system may continue to use this value as road wetness information, preferably until the interference effects have disappeared from the environment of the means of transport. In this manner, especially time-limited interference effects may also be advantageously avoided since the short-term appearance and disappearance thereof do not lead to undesirably frequent changes in the road wetness information. This, in turn, prevents frequently changing the predefined sets of parameters undesirably.

As described above, the first ultrasonic sensor may be mounted on the means of transport in such a way that a detection range of the first ultrasonic sensor lies in the direction of travel of the means of transport or counter thereto. Moreover, the environment of the means of transport may additionally be detected on the basis of a second ultrasonic sensor and, in particular, detected by a second ultrasonic sensor, which is mounted on the means of transport in such a way that a detection range of the second ultrasonic sensor lies in the direction of travel of the means of transport or counter thereto. In a preferred variant, the first ultrasonic sensor, for example, may be oriented in the direction of travel of the means of transport and the second ultrasonic sensor counter thereto. In this manner, the road wetness information may be ascertained on the basis of both ultrasonic sensors, whereby an additional checking of the plausibility of the road wetness information obtained from the respective first signals is possible. Alternatively, the road wetness information may be alternately determined on the basis of the first or second ultrasonic sensor by evaluating the first signal of that ultrasonic sensor for road wetness, which has the lowest proportion of interference effects at a current point in time. In this connection, it is noted that, in addition to the first and second ultrasonic sensor, other ultrasonic sensors may be used for the method according to the present invention. This means that third, fourth and so on ultrasonic sensors may be used, for example, which may be combined and used analogously to the embodiments described above. The first, second, third, fourth and possibly further ultrasonic sensor(s) are explicitly not limited in the placement thereof to the front and/or rear part of the means of transport.

Another advantageous embodiment of the present invention provides that the plausibility of the road wetness information ascertained from the first signal be checked using a road wetness information ascertained from the second signal. This may be accomplished by analyzing reflections of light sources in the camera image, for example, by checking whether these light sources lie above or apparently below a roadway plane. Moreover, the plausibility of the road wetness information may also be validated by other sensors and/or control units of the means of transport. Here, a rain sensor mounted on a windshield of the means of transport is possible, for example, or also other sensors of the means of transport.

Information about objects in the environment of the means of transport ascertained by the environment recognition may subsequently be transmitted, inter alia, to a driver assistance system and/or to a system for autonomously controlling the means of transport and used there.

In accordance with a second aspect of the present invention, an apparatus is provided for supporting a camera-based environment recognition of a means of transport using road wetness information from a first ultrasonic sensor. In accordance with an example embodiment of the present invention, the apparatus includes an evaluation unit and a data input. The evaluation unit may be in the form of an ASIC, FPGA, processor, digital signal processor, microcontroller, or the like and be connected by information technology to an internal and/or external memory unit. Moreover, the evaluation unit may be adapted to implement the method according to the present invention in conjunction with a computer program executed by the evaluation unit. Furthermore, in conjunction with the data input, the evaluation unit is adapted for recording a first signal determined by the first ultrasonic sensor of the means of transport representing an environment of the means of transport and for recording a second signal determined by a camera of the means of transport representing the environment of the means of transport. The ultrasonic sensor may preferably be an already existing ultrasonic sensor of the means of transport. In addition, the ultrasonic sensor may be mounted in a front bumper or in the area of a rear-end section of the means of transport or also at other positions of the means of transport, for example, making it possible for either the roadway ahead or behind and the environment thereof to be recorded. The camera may be a 2D or 3D camera, for example, having a standard image resolution, an HD or an ultra HD image resolution, or an infrared camera. The camera may preferably be mounted and oriented on the means of transport in a way that enables it to record an environment ahead of the same. The evaluation unit may be directly and/or indirectly connected by information technology via an electrical system of the means of transport to the ultrasonic sensor and the camera. Moreover, the evaluation unit is adapted for ascertaining road wetness information on the basis of the first signal, for selecting a predefined set of parameters from a plurality of predefined sets of parameters as a function of the road wetness information, and for performing an environment recognition on the basis of the second signal in conjunction with the predefined set of parameters.

BRIEF DESCRIPTION OF THE DRAWINGS

Exemplary embodiments of the present invention are described in detail below with reference to the figures.

DETAILED DESCRIPTION OF EXAMPLE EMBODIMENTS

Figure 1:
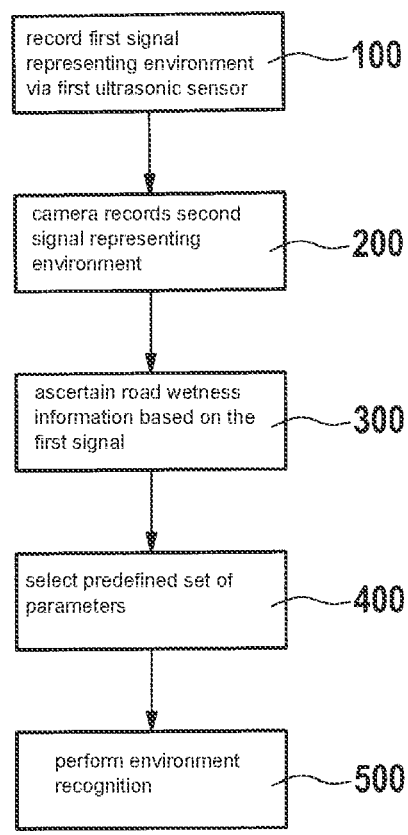
FIG. 1 shows a flow chart illustrating steps of an exemplary embodiment of a method according to the present invention.

FIG. 1 shows a flow chart illustrating steps of an exemplary embodiment of a method according to the present invention for supporting a camera-based environment recognition of a means of transport 80 using road wetness information from a first ultrasonic sensor 30. In a first step 100, an inventive evaluation unit 10, which is a microcontroller, is used for recording a first signal representing an environment 60 of means of transport 80 via first ultrasonic sensor 30 of means of transport 80. First ultrasonic sensor 30 is disposed in a front apron of means of transport 80 and oriented in the direction of travel thereof. Evaluation unit 10 receives the first signal via a data input 12 thereof and stores environment information represented by the first signal in an internal memory unit 20 of the microcontroller. In step 200, a camera 40 of means of transport 80 records a second signal representing environment 60 of means of transport 80. Camera 40 is mounted in an interior of means of transport 80 in an upper region of a windshield thereof and oriented to capture an environment 60 ahead of the same. An image processing unit of means of transport 80 that is connected by information technology to camera 40, receives second signal from camera 40. The first signal from ultrasonic sensor 30 and the second signal from camera 40 are essentially acquired at an identical instant. In step 300, a computer program executed by evaluation unit 10 ascertains road wetness information on the basis of the first signal. For this purpose, evaluation unit 10 compares a noise level 70 of the first signal to a predefined threshold value 75 for a noise level 70. When noise level 70 exceeds predefined threshold value 75, the presence of road wetness in environment 60 of means of transport 80 may be inferred. Since, in this case, the presence of road wetness is recognized on the basis of predefined threshold value 75, evaluation unit 10 transmits a signal, which is indicative thereof and contains the current road wetness information, via a vehicle bus of an electrical system of means of transport 80 to the image processing unit. In step 400 of the method according to the present invention, the image-processing unit selects a predefined set of parameters from a plurality of predefined sets of parameters as a function of the received road wetness information. The set of parameters, which the image processing unit selects in this case, represents a configuration of a classifier based on a neural network which had been trained at an earlier point in time (for example, in a development phase of means of transport 80) under similar wet road conditions. In step 500, image-processing unit performs an environment recognition on the basis of the second signal in conjunction with the predefined set of parameters. Information about objects in environment 60 of means of transport 80 ascertained by environment recognition is then transmitted by the electrical system to a system for autonomously controlling means of transport 80 and used by the same in the course of autonomously controlling means of transport 80.

Figure 2:
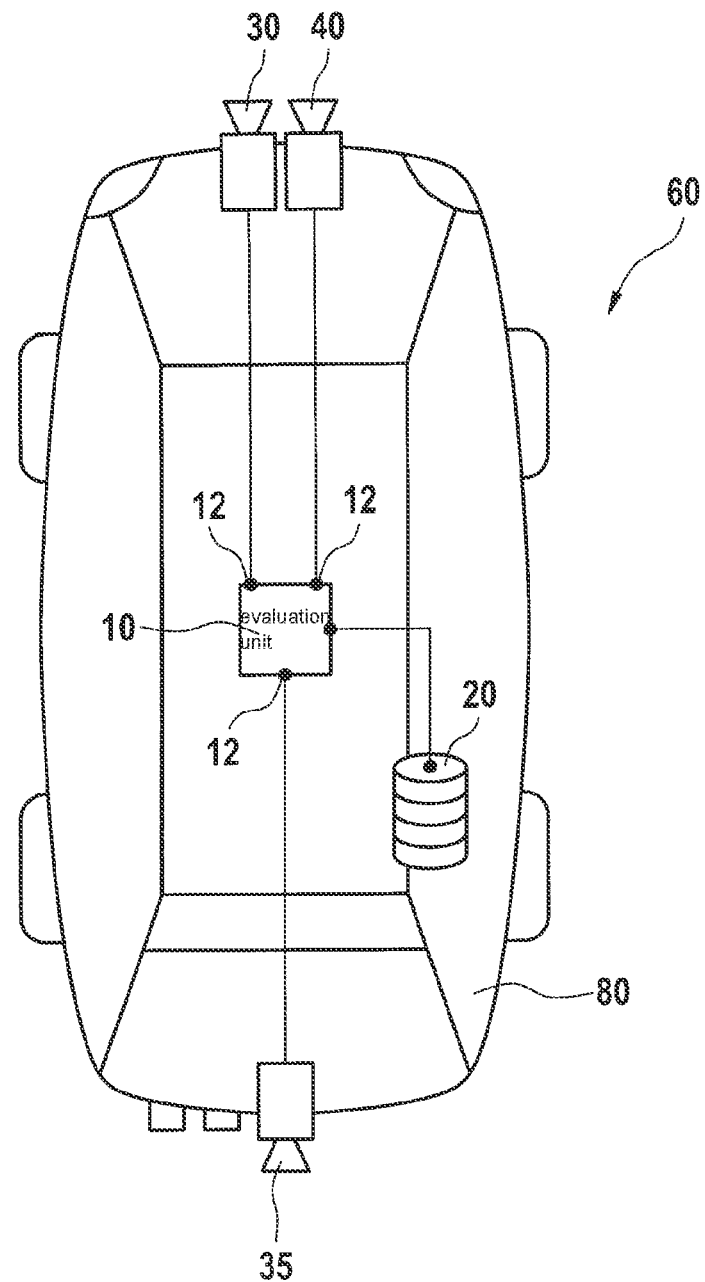
FIG. 2 shows a block diagram of an apparatus according to the present invention in conjunction with a means of transport.

FIG. 2 shows a block diagram of an apparatus according to the present invention in conjunction with a means of transport 80. The apparatus includes an evaluation unit 10 which, here, is a microcontroller and has a data input 12. Evaluation unit 10 is connected by data input 12 to a first ultrasonic sensor 30 oriented in the travel direction of means of transport 80, and a second ultrasonic sensor 35 oriented counter to the travel direction is connected by information technology via an electrical system of means of transport 80. Via data input 12, evaluation unit 10 is likewise connected by information technology via the electrical system of means of transport 80 to a camera 40 oriented in the travel direction of means of transport 80. Moreover, evaluation unit 10 is connected by information technology to an external memory unit 20 which is adapted for storing information received by evaluation unit 10 for a subsequent processing by evaluation unit 10. With the assistance of first ultrasonic sensor 30, second ultrasonic sensor 35 and camera 40, evaluation unit 10 is able to capture an environment 60 of means of transport 80 at substantially identical instants. In this example, all steps of the example method in accordance with the present invention are executed in evaluation unit 10 itself, i.e., evaluation unit 10 is not only adapted for determining road wetness information on the basis of first signals from first ultrasonic sensor 30 and second ultrasonic sensor 35, but also for selecting a predefined set of parameters, which corresponds with the road wetness information, and for performing an environment recognition using the predefined set of parameters on the basis of a second signal from camera 40.

Figure 3:
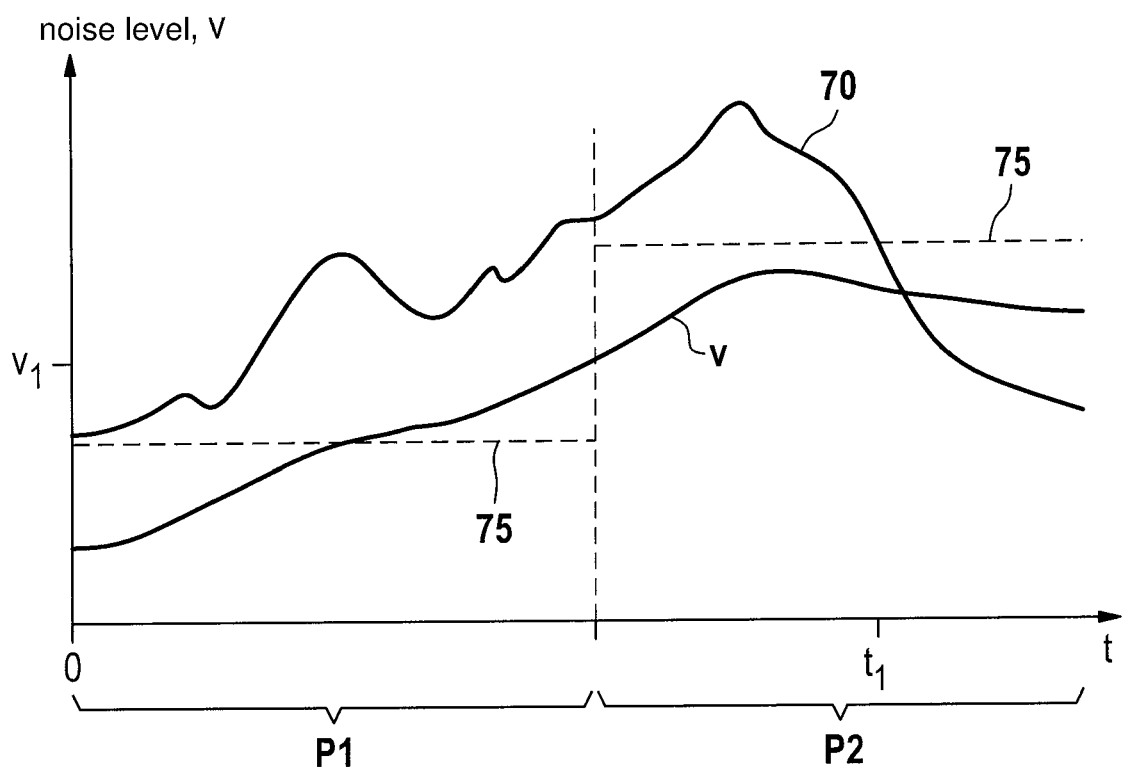
FIG. 3 shows a diagram of a velocity-dependent noise level of a first ultrasonic sensor.

FIG. 3 shows a diagram of a velocity-dependent noise level 70 of a first ultrasonic sensor 30. In a first phase P1 of the diagram, a means of transport 80, which uses first ultrasonic sensor 30 along the lines of the method according to the present invention, travels at a velocity v, which corresponds to a predefined threshold value 75 of first phase P1. In other words, because of an initially relatively low velocity v of means of transport 80 in first phase P1, that predefined threshold value 75 of a plurality of predefined threshold values 75, which has previously been set for this velocity range, is used for comparison with noise level 70 of the first signal. Since noise level 70 in first phase P1 is completely above predefined threshold value 75 of first phase P1, an evaluation unit 10 according to the present invention ascertains the presence of a road wetness. From the profile of velocity v, it is discernible that velocity v of means of transport 80 continues to increase here over time. Upon reaching a velocity value v1, evaluation unit 10 selects a predefined threshold value 75, which deviates from predefined threshold value 75 of first phase P1, for a second phase P2 on the basis of higher velocity v existing at this stage. Predefined threshold value 75 of second phase P2 is thereby adapted to noise level 75 produced by higher velocity v. As in first phase P1, the presence of a road wetness is initially detected here again since, at the beginning of second phase P2, noise level 70 is above predefined threshold value 75 of second phase P2. At a point in time t1 in second phase P2, the curve of noise level 70 drops to below predefined threshold value 75 of second phase P2. In response thereto, evaluation unit 10 ascertains a dry road surface.

What is claimed is:

1. A method for supporting a camera-based environment recognition by a transport device using road wetness information from a first ultrasonic sensor, comprising the following steps:

recording a first signal representing an environment of the transport device via the first ultrasonic sensor of the transport device;

recording a second signal representing the environment of the transport device via a camera of the transport device;

ascertaining the road wetness information based on the first signal, wherein the road wetness information is ascertained by comparing a noise level of the first signal to a velocity-dependent predefined threshold value of a plurality of predefined threshold values, wherein the plurality of predefined threshold values are based on a velocity range;

selecting a predefined set of parameters from a plurality of predefined sets of parameters as a function of the road wetness information; and performing an environment recognition based on the second signal in conjunction with the selected predefined set of parameters.

2. The method as recited in claim 1, wherein the first signal and the second signal are recorded at a substantially identical instant.

3. The method as recited in claim 1, wherein the road wetness information is additionally ascertained as a function of a velocity of the transport device and/or an acceleration of the transport device and/or a motor speed of the transport device.

4. The method as recited in claim 1, wherein the predefined set of parameters represent a configuration of a trained, self-learning system.

5. The method as recited in claim 1, wherein the predefined set of parameters are selected as a function of a change in the noise level and/or a current outside temperature and/or an amount of water present in the environment of the transport device.

6. The method as recited in claim 1, wherein the road wetness information is ascertained as a function of a freedom from interference of the first signal.

7. The method as recited in claim 1, wherein the first ultrasonic sensor is mounted on the transport device in such a way that a detection range of the first ultrasonic sensor lies in a direction of travel of the transport device or counter to the direction of travel of the transport device.

8. The method as recited in claim 1, where the environment is detected based on a second ultrasonic sensor, which is mounted on the transport device in such a way that a detection range of the second ultrasonic sensor lies in a direction of travel of the transport device or counter to the direction of travel of the transport device.

9. The method as recited in claim 1, wherein plausibility of the road wetness information ascertained from the first signal is checked using road wetness information ascertained from the second signal.

10. An apparatus for supporting a camera-based environment recognition by a transport device using road wetness information from a first ultrasonic sensor, comprising:

an evaluation unit; and a data input;

wherein the evaluation unit is configured to, in conduction with the data input:

record a first signal representing an environment of the transport device determined by the first ultrasonic sensor of the transport device;

record a second signal representing the environment of the transport device determined by a camera of the transport device;

ascertain the road wetness information based on the first signal, wherein the road wetness information is ascertained by comparing a noise level of the first signal to a velocity-dependent predefined threshold value of a plurality of predefined threshold values, wherein the plurality of predefined threshold values are based on a velocity range;

select a predefined set of parameters from a plurality of predefined sets of parameters as a function of the road wetness information; and performing an environment recognition based on the second signal in conjunction with the selected predefined set of parameters.

\* \* \* \* \*